US007283713B1

(12) United States Patent
Wood

(10) Patent No.: US 7,283,713 B1

(45) Date of Patent: Oct. 16, 2007

(54) HIGHLY DISPERSIVE DISPERSION COMPENSATING FIBER FOR TRANSMISSION FIBER AND TRANSMISSION SYSTEM UTILIZING SAME

(75) Inventor: William Allen Wood, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 11/399,009

(22) Filed: Apr. 5, 2006

(51) Int. Cl.
*G02B 6/36* (2006.01)

(52) U.S. Cl. .................................. 385/126; 385/123

(58) Field of Classification Search ......... 385/123–128
See application file for complete search history.

(56) References Cited

U.S. PATENT DOCUMENTS 5,555,340 A 9/1996 Onishi et al. ............... 385/127
5,568,583 A 10/1996 Akasaka et al. ............ 385/123
6,400,877 B1 * 6/2002 Kato et al. .................. 385/123
6,445,864 B2 9/2002 Jiang et al. ................. 385/127
6,757,468 B2 6/2004 Bickham et al. ............ 385/127
6,768,852 B2 7/2004 Zhang ........................ 385/127
6,789,960 B2 9/2004 Bickham et al. .............. 385/96
6,888,993 B2 5/2005 Zhang ........................ 385/127
6,925,237 B2 8/2005 Hebgen et al. ............. 385/124
6,985,662 B2 1/2006 Bickham .................... 385/127
6,987,918 B1 1/2006 Bickham .................... 385/127
2005/0185905 A1 8/2005 Burke et al. ................ 385/123

* cited by examiner

*Primary Examiner*—Frank G. Font
*Assistant Examiner*—Michael P. Mooney
(74) *Attorney, Agent, or Firm*—Joseph M. Homa

(57) ABSTRACT

A dispersion compensating optical fiber is disclosed which is highly dispersive and which has a low effective area. The dispersion compensating optical fiber is suited for use with transmission optical fiber such as conventional single mode fiber. An optical transmission fiber and optical transmission system are also disclosed.

21 Claims, 2 Drawing Sheets

HIGHLY DISPERSIVE DISPERSION COMPENSATING FIBER FOR TRANSMISSION FIBER AND TRANSMISSION SYSTEM UTILIZING SAME

BACKGROUND OF THE INVENTION

1. Field of the Invention

The present invention relates generally to optical fiber, and particularly to dispersion compensating optical fibers and systems employing same.

2. Technical Background

While some optical transmission systems can tolerate fairly large amounts of residual dispersion at 10 Gbit/second, these systems can tolerate only small amounts of residual dispersion at higher transmission rates of about 40 Gbit/second without causing unwanted signal distortion. Dispersion in such high bit-rate optical transmission systems needs to be controlled at the wavelength, or wavelengths, or interest. Various solutions have been proposed to achieve dispersion, and dispersion slope, values required for compensating transmission fibers. One approach involves housing a dispersion compensating fiber in a dispersion compensating module wherein the dispersion compensating fiber compensates for the accumulated dispersion of the transmission fiber at a location where the fiber end is accessible. Such modules include a length of dispersion compensating fiber wound onto a spool or reel.

Wavelength division multiplexing (WDM) systems have operated around the 1550 nm wavelength region, defined herein as including the C-band, which includes wavelengths between about 1525 nm to about 1565, and the L-band, which includes wavelengths between about 1565 nm to about 1625 nm

SUMMARY OF THE INVENTION

Dispersion compensating optical fiber ("DCF") disclosed herein comprises highly negative dispersion and low effective area for operating wavelengths in the C-band, the L-band, or both the C-band and L-band. The DCF also comprises a kappa that provides dispersion compensation for an optical transmission fiber ("transmission fiber") at a plurality of wavelengths within a wavelength band. Also disclosed herein are optical fiber transmission lines which comprise transmission fiber and such DCF. Some embodiments of the DCF disclosed herein are particularly well suited for compensating the dispersion of transmission fiber having a dispersion at 1550 nm between 14 and 22 ps/nm-km, such as SMF-28e optical fiber manufactured and sold by Corning Incorporated. The transmission fiber may have a dispersion slope at 1550 nm of less than 0.07 ps/nm$^2$-km, or less than 0.07 ps/nm$^2$-km and greater than 0.05 ps/nm$^2$-km, such as SMF-28e optical fiber. In some embodiments, an optical fiber transmission line is disclosed herein comprising a transmission optical fiber having a dispersion at 1550 nm between 14 and 22 ps/nm-km and a dispersion slope at 1550 nm less than 0.07 ps/nm$^2$-km optically coupled to at least one DCF disclosed herein.

The DCF disclosed herein comprises a core disposed about a centerline, and a cladding surrounding the core. The core comprises a central segment extending radially outward from the centerline, a first annular segment surrounding the central segment, and a second annular segment surrounding the first annular segment.

In some embodiments, the core and cladding define a relative refractive index profile which provides an effective area at 1550 nm less than or equal to 15.0 μm$^2$, a dispersion at 1550 nm more negative than −150 ps/nm/km, and a kappa at 1550 nm greater than 100 nm, wherein kappa is dispersion at 1550 nm divided by dispersion slope at 1550 nm.

The relative refractive index profile of the central segment of the DCF disclosed herein preferably has an alpha shape with an alpha greater than 10, more preferably greater than 15, for improved bending performance. In some embodiments, the profile of the central segment has a step shape, or slightly rounded step.

In some embodiments, the DCF exhibits a pin array bend loss at 1550 nm of less than 10 dB.

In some embodiments, kappa at 1550 nm is greater than 200 nm.

In some embodiments, the central segment comprises a maximum relative refractive index $\Delta_{1MAX}$ greater than 1.8%.

In some embodiments, the first annular segment comprises a minimum relative refractive index $\Delta 2_{MIN}$ more negative than −0.35%.

In some embodiments, the central segment extends to a radius, R1, between 0.7 and 1.5 μm.

In some embodiments, the first annular segment extends to a radius, R2, between 3.0 and 4.5 μm.

In some embodiments, the first annular segment extends for a radial width, $W_2$, between 2.0 and 3.0 μm.

In some embodiments, the first annular segment has a midpoint, $R2_{MID}$, between 2.1 and 2.7 μm.

In some embodiments, the second annular segment comprises a maximum relative refractive index $\Delta 3_{MAX}$ greater than 0.25%.

In some embodiments, the second annular segment has half-height peak width, HHPW3, between 0.5 and 1.2 μm.

In some embodiments, the second annular segment has half-height peak midpoint, $R3_{HHMID}$, between 4.0 and 6.0 μm.

In some embodiments, the second annular segment has a midpoint, $R3_{MID}$, between 4.0 and 6.0 μm.

In some embodiments, the second annular segment has a width, W3, between 0.5 and 4.0 μm.

In some embodiments, the refractive index profile provides a mode field diameter at 1550 nm of between 3.90 and 4.20 μm.

In some embodiments, the refractive index profile provides a theoretical cutoff of less than 1570 nm.

In some embodiments, the product of the effective area at 1550 nm and the absolute magnitude of the dispersion at 1550 nm is greater than 2000 attoseconds.

In some embodiments, the refractive index profile provides a dispersion slope at 1550 nm of between −0.5 and −1.0 ps/nm$^2$/nm.

In one aspect, an optical fiber transmission line is disclosed herein comprising a transmission optical fiber having a dispersion at 1550 nm between 14 and 22 ps/nm-km and a dispersion slope at 1550 nm less than 0.08 ps/nm$^2$-km and a dispersion compensating fiber of claim 1 optically coupled to the transmission optical fiber. In another aspect, an optical fiber transmission system incorporating such transmission line is also disclosed herein.

Reference will now be made in detail to the present preferred embodiments of the invention, examples of which are illustrated in the accompanying drawings.

DETAILED DESCRIPTION OF THE PREFERRED EMBODIMENT

Figure 1:
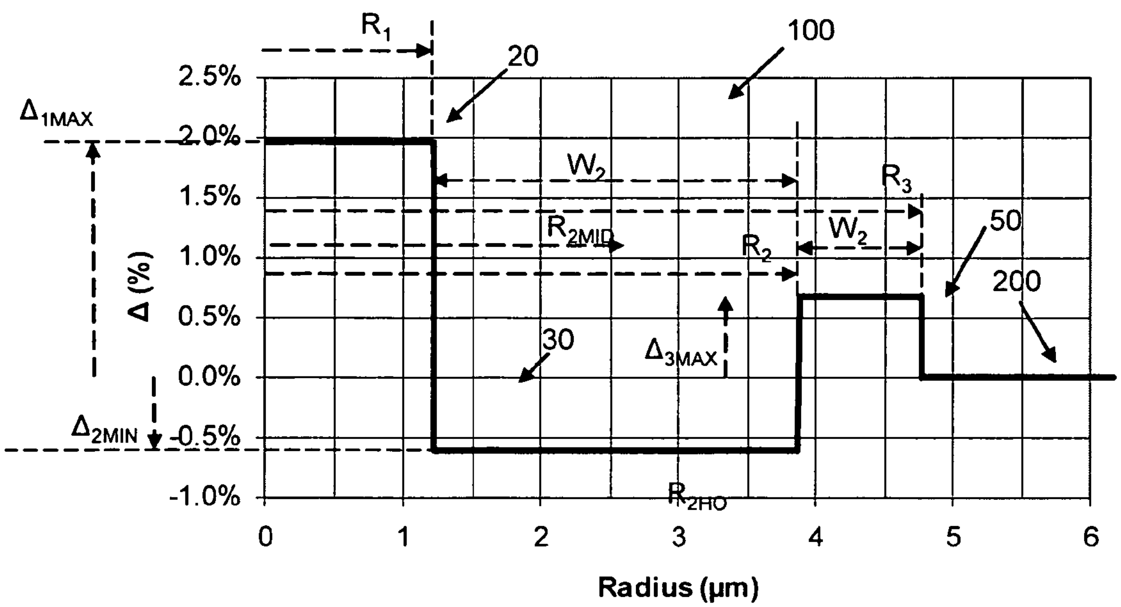
FIG. 1 shows a relative refractive index profile corresponding to a first embodiment of optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\%=100\times(n_i^2-n_c^2)/2n_c^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff}=2\pi(\int f^2 r dr)^2/(\int f^4 r dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" or "alpha profile" refers to a relative refractive index profile, expressed in terms of $\Delta(r)$ which is in units of "%", where r is radius, which follows the equation, $$\Delta(r)=\Delta(r_o)(1-[|r-r_o|/(r_1-r_o)]^{\alpha}),$$

where $r_o$ is the point at which $\Delta(r)$ is maximum, $r_1$ is the point at which $\Delta(r)\%$ is zero, and r is in the range $r_i \leqq r \leqq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, 2w=MFD, and $w^2=(2\int f^2 r\,dr/\int[df/dr]^2 r\,dr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Unless otherwise noted herein, optical properties (such as dispersion, dispersion slope, etc.) are reported for the LP01 mode.

An optical transmission line as used herein includes a length of optical fiber, or a plurality of optical fibers fused together serially, extending between optical devices, for example between two optical amplifiers, or between a multiplexing device and an optical amplifier. The optical transmission line may comprise transmission fiber and dispersion compensating fiber, wherein the dispersion compensating fiber may be deployed in a module (DC module) or laid out lengthwise, or both, as selected to achieve a desired system performance or parameter such as residual dispersion at the end of an optical transmission line.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1525 to 1565 nm; "L-band" is 1565 to 1625 nm; and "U-band" is 1625 to 1675 nm.

The optical fiber 10 disclosed herein comprises a core 100 and a cladding layer (or cladding) 200 surrounding and directly adjacent the core. The cladding 200 has a refractive index profile, $\Delta_{CLAD}(r)$. Preferably, $\Delta_{CLAD}(r)=0$ throughout the cladding 200.

The core 100 preferably comprises silica doped with germanium, i.e. germania doped silica. Dopants other than germanium, singly or in combination, may be employed within the core, and particularly at or near the centerline, of the optical fiber disclosed herein to obtain the desired refractive index and density. The core 100 of the optical fiber disclosed herein comprises a relative refractive index profile with both positive and negative segments. The core 100 is surrounded by and directly adjacent to a cladding layer 200.

Dispersion compensating optical fiber 10 disclosed herein comprises a core 100, disposed about a centerline and comprising a refractive index profile, and a cladding 200 surrounding the core. The core 100 comprises a central segment 20 extending radially outwardly from the centerline, a first annular segment 30 surrounding the central segment 20, and a second annular segment 50 surrounding the first annular segment 30. The central segment 20 has a relative refractive index profile, $\Delta_1(r)$, having a maximum relative refractive index $\Delta_{1MAX}$, wherein $\Delta_1(r)$ is positive. The first annular segment 30 has a relative refractive index profile, $\Delta_2(r)$ wherein $\Delta_2(r)$ is negative. The second annular segment 50 has a relative refractive index profile, $\Delta_3(r)$, having a maximum relative refractive index $\Delta_{3MAX}$, wherein $\Delta_3(r)$ is non-negative, and wherein $\Delta_3(r)$ is positive in at least a portion of the second annular segment.

The central segment 20 extends from the centerline to a radius R1 where $\Delta$=0%, i.e. where the relative refractive index profile crosses the $\Delta$=0% axis and goes from positive in the central segment 20 to negative in the first annular segment 30.

First annular segment (or moat) 30 surrounds the central segment 20 and is directly adjacent thereto, extending radially outwardly to a first annular segment outer radius, $R_2$, where $\Delta$ first reaches 0%, i.e. where the relative refractive index profile reaches the $\Delta$=0% axis i.e. goes from negative in the first annular segment 30 to non-negative in the second annular segment 50. First annular segment 30 has a width $W_2$(=R2−R1) disposed at a midpoint $R_{2MID}$(=(R1+R2)/2) and has a relative refractive index percent, $\Delta_2$ %(r). The first annular segment 30 is directly adjacent the central core segment 20.

Second annular segment (or ring) 50 surrounds the first annular segment 30 and preferably directly adjacent thereto and extends to a second annular segment outer radius R3 where the relative refractive index profile first reaches $\Delta$=0.03% at a radial location greater than the radius where $\Delta_{3MAX}$ occurs. Segment 50 has a width $W_3$(=R3−R2) disposed at a midpoint $R_{3MID}$(=(R2+R3)/2), and has a positive relative refractive index percent, $\Delta_3$ %(r)>0, wherein preferably $\Delta_{1MAX}>\Delta_{3MAX}>0$. The second annular segment 50 has a non-negative relative refractive index profile wherein at least a portion of the segment 50 has a positive relative refractive index profile with a "peak" or a maximum relative refractive index percent, $\Delta_{3MAX}$. $R_{3HHi}$ marks the first radially inward, or centermost, occurrence of the half-height of $\Delta_{3,MAX}$. $R_{3HHj}$ marks the first radially outward occurrence of the half-height of $\Delta_{3,MAX}$. The ring half-height peak width $HHPW_3$ is bounded by inner and outer radii, $R_{3HHi}$ and $R_{3HHj}$, respectively. The midpoint of the ring half-height peak width $HHPW_3$ occurs at a radius $R_{3HHMID}$ which is half the radial distance between $R_{3HHi}$ and $R_{3HHj}$. $\Delta_{3MAX}$ may occur at $R_{3HHMID}$. In some embodiments, $R_{3HHMID}$ coincides with the middle of the segment 50, $R_{3MID}$, between $R_2$ and $R_3$. The second annular segment 50 is directly adjacent the first annular segment 30.

Cladding 200 surrounds the second annular segment 50 and is preferably adjacent thereto and has a relative refractive index percent, $\Delta_c$ %(r). Cladding 200 constitutes the outermost silica part of the fiber. The core ends and the cladding begins at a radius $R_{CORE}$.

In some embodiments, the core comprises a relative refractive index profile having a so-called centerline dip which may occur as a result of one or more optical fiber manufacturing techniques. However, the centerline dip in any of the refractive index profiles disclosed herein is optional.

In some embodiments, the effective area at 1550 nm is greater than 10 $\mu m^2$ and less than or equal to 15.0 $\mu m^2$.

Preferably, the DCF exhibits a pin array bend loss at 1550 nm of less than 10 dB. In some embodiments, the DCF exhibits a pin array bend loss at 1550 nm of less than 5 dB.

In some embodiments, the kappa of the DCF at 1550 nm is greater than 200 nm, and in other embodiments, between 250 and 350 nm.

In some embodiments, the dispersion of the DCF at 1550 nm is more negative than −150 ps/nm/km and less negative than −250 ps/nm/km. In other embodiments, the dispersion at 1550 nm is more negative than −200 ps/nm/km.

In some embodiments, $\Delta_{1MAX}$ is greater than 1.8%. In other embodiments, $\Delta_{1MAX}$ is greater than or equal to 2.0%. In other embodiments, $\Delta_{1MAX}$ is greater than 1.8% and less than 2.5%.

In some embodiments, $\Delta2_{MIN}$ is more negative than −0.35%. In other embodiments, $\Delta2_{MIN}$ is more negative than −0.35% and more positive than −0.70%.

In some embodiments, the central segment extends to a radius, R1, between 0.7 and 1.5 μm, and in other embodiments between 0.9 and 1.3 μm.

In some embodiments, the first annular segment extends to a radius, R2, between 3.0 and 4.5 μm, and in other embodiments between 3.0 and 4.0 μm.

In some embodiments, $W_2$ is between 2.0 and 3.0 μm.

In some embodiments, $R2_{MID}$ is between 2.1 and 2.7 μm, and in other embodiments between 2.2 and 2.6 μm.

In some embodiments, $\Delta3_{MAX}$ is greater than 0.25%, and in other embodiments greater than 0.30%. In other embodiments, $\Delta3_{MAX}$ is between 0.25% and 0.8%. In other embodiments, $\Delta3_{MAX}$ is between 0.30% and 0.70%.

In some embodiments, the second annular segment has half-height peak width, HHPW3, between 0.5 and 1.2 μm.

In some embodiments, the second annular segment has half-height peak midpoint, $R3_{HHMID}$, between 4.0 and 6.0 μm.

In some embodiments, the second annular segment has a midpoint, $R3_{MID}$, between 4.0 and 6.0 μm. In some embodiments, the second annular segment has a width, W3, between 0.5 and 4.0 μm.

In some embodiments, the refractive index profile provides a mode field diameter at 1550 nm of between 3.90 and 4.20 μm.

In some embodiments, the refractive index profile provides a theoretical cutoff of less than 1570 nm, and in other embodiments, less than 1500 nm.

In some embodiments, the product of the effective area at 1550 nm and the absolute magnitude of the dispersion at 1550 nm is greater than 2000 attoseconds, and in other embodiments between 2000 and 3500 attoseconds.

In some embodiments, the refractive index profile provides a dispersion slope at 1550 nm of between −0.5 and −1.0 ps/nm$^2$/nm.

Figure 2:
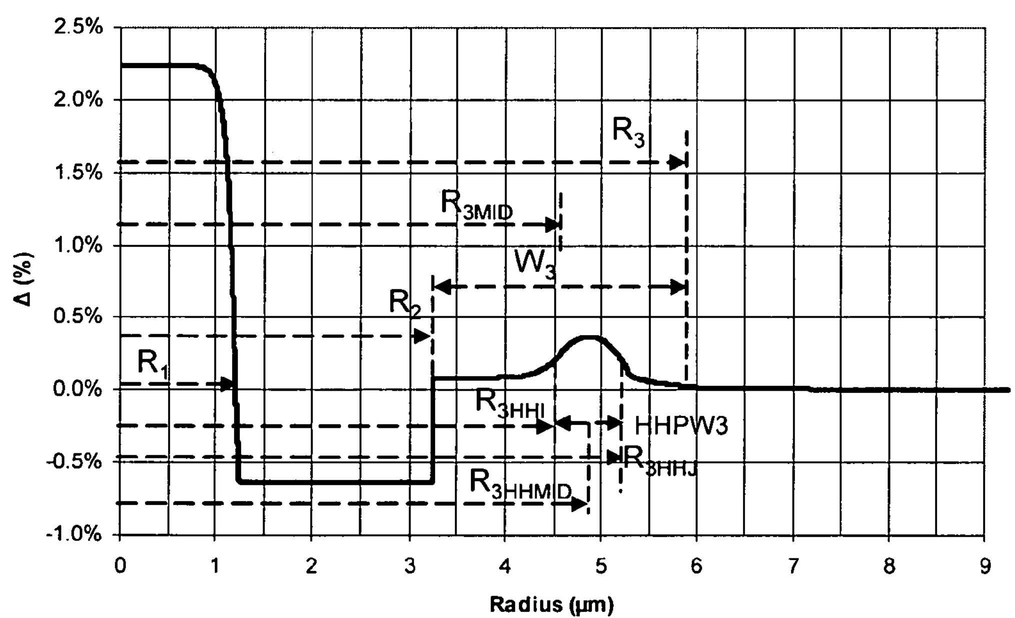
FIG. 2 shows a relative refractive index profile corresponding to a second embodiment of optical waveguide fiber as disclosed herein.

Tables 1-2 list an illustrative set of embodiments, Examples 1-8. FIG. 1 shows the corresponding relative refractive index profile of Example 1 in curve 1, and FIG. 2 shows the corresponding relative refractive index profile of Example 2 in curve 2. FIG. 2 is also representative of the relative refractive index profiles of Examples 3-8 as further defined in Table 1. The alpha's of the relative refractive index profiles of the central segments of all of the Examples are greater than about 15.

TABLE 1

| | | Example | | | | | | | |
|---|---|---|---|---|---|---|---|---|---|
| | | 1 | 2 | 3 | 4 | 5 | 6 | 7 | 8 |
| $\Delta_{1MAX}$ | % | 1.96 | 2.24 | 2.24 | 2.31 | 2.35 | 2.31 | 2.39 | 2.46 |
| $\alpha_1$ | | (step) | 15 | 15 | 15 | 15 | 15 | 15 | 15 |
| R1 | μm | 1.2 | 1.2 | 1.25 | 1.1 | 1.1 | 1.1 | 1.1 | 1.1 |
| $\Delta_{2MIN}$ | % | −0.61 | −0.64 | −0.58 | −0.57 | −0.52 | −0.57 | −0.42 | −0.62 |
| R2 | μm | 3.9 | 3.3 | 3.5 | 3.5 | 3.6 | 3.5 | 3.9 | 3.3 |
| $W_2$ | μm | 2.7 | 2.1 | 2.25 | 2.4 | 2.5 | 2.4 | 2.8 | 2.2 |
| $R2_{MID}$ | μm | 2.6 | 2.3 | 2.4 | 2.3 | 2.4 | 2.3 | 2.5 | 2.2 |
| $\Delta_{3MAX}$ | % | 0.68 | 0.37 | 0.49 | 0.51 | 0.52 | 0.51 | 0.49 | 0.61 |
| $R3_{HHi}$ | μm | 3.9 | 4.5 | 4.8 | 4.7 | 4.96 | 4.7 | 5.2 | 4.7 |
| $R3_{HHJ}$ | μm | 4.8 | 5.2 | 5.5 | 5.3 | 5.6 | 5.3 | 5.8 | 5.3 |
| HHPW3 | μm | 0.9 | 0.7 | 0.7 | 0.6 | 0.64 | 0.6 | 0.6 | 0.6 |
| $R_{HHMID}$ | μm | 4.35 | 4.85 | 5.15 | 5 | 5.28 | 5 | 5.5 | 5 |
| $R_3 = R_{CORE}$ | μm | 4.8 | 5.8 | 6.2 | 6.0 | 6.3 | 6.0 | 6.0 | 6 |
| $W_3$ | μm | 0.9 | 2.5 | 2.7 | 2.5 | 2.7 | 2.5 | 2.1 | 2.7 |
| $R_{3MID}$ | μm | 4.35 | 4.55 | 4.85 | 4.75 | 4.95 | 4.75 | 4.95 | 4.65 |

embodiments between 0.055 and 0.070 ps/nm$^2$-km, and in other embodiments between 0.058 and 0.065 ps/nm$^2$-km.

Figure 3:
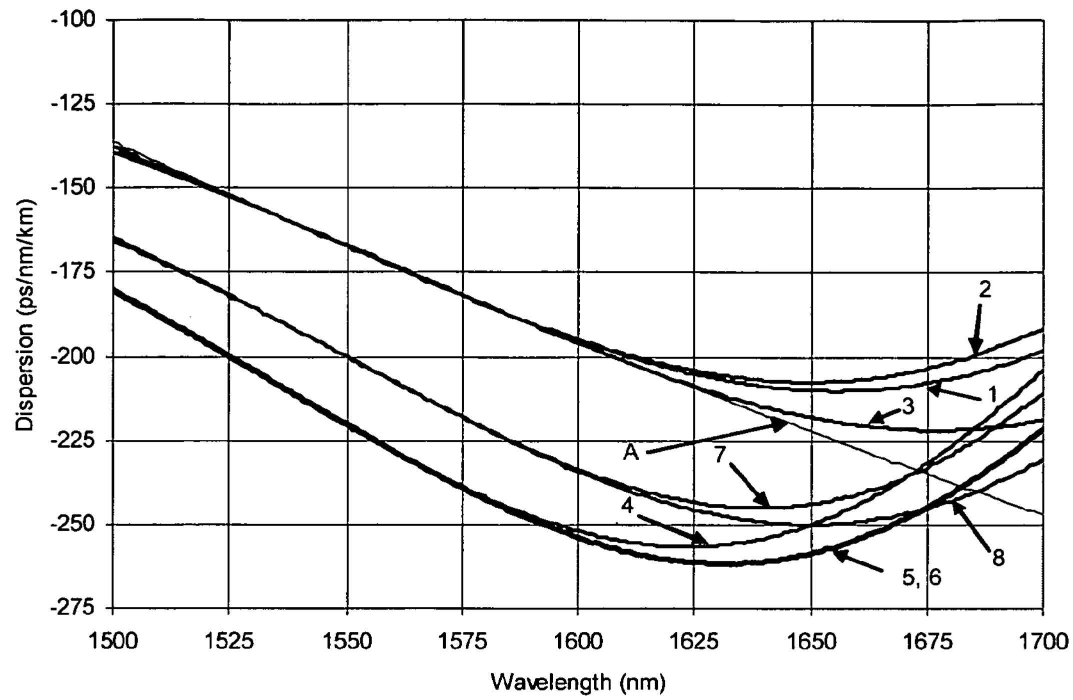
FIG. 3 shows respective dispersion vs. wavelength curves for the optical fiber embodiments of FIGS. 1-2 and five other embodiments.

FIG. 3 shows the corresponding dispersion curves (versus wavelength) of embodiments represented by Examples 1-8 in curves 1-8, respectively. Examples 5 and 6 have substantially similar dispersion curves 5 and 6. Curve A in FIG. 3 shows the dispersion curve of one representative transmission optical fiber having a dispersion at 1550 nm of about 16.7 ps/nm-km and a dispersion slope at 1550 nm of about 0.06 ps/nm$^2$-km, wherein the dispersion has been multiplied by a factor of −10 for purposes of illustrating the positive dispersion and the negative dispersions in one chart. The overlap of Curves 1 and 2 with Curve A shows that Examples 1 and 2 are well suited to compensate the dispersion of such transmission fiber, particularly at wavelengths between 1525 and 1565 nm. The overlap of Curve 3 with Curve A shows that Example 3 is well suited to compensate the dispersion of such transmission fiber, particularly at wavelengths between 1525 and 1625 nm. Similarly, FIG. 3 shows that Examples 4, 5 and 6 are well suited to compensate the dispersion of a transmission fiber having a dispersion at 1550 nm of about 22 ps/nm-km and a dispersion slope at 1550 nm of about 0.078 ps/nm$^2$-km, particularly at wavelengths between 1525 and 1565 nm, and also into the L-band (from 1565 nm to about 1590 nm) and Examples 7 and 8 are well suited to compensate the dispersion of a transmission fiber having a dispersion at 1550 nm of about 20 ps/nm-km and a dispersion slope at 1550 nm of about 0.073 ps/nm$^2$-km, particularly at wavelengths between 1525 and 1565 nm, and also into the L-band (from 1565 nm to about 1600 nm).

In one aspect, an optical fiber transmission system is disclosed herein comprising an optical source for transmitting optical signals through a transmission optical fiber and a dispersion compensating fiber disclosed herein, wherein the transmission optical fiber has a first length, the dispersion compensating fiber has a second length, and wherein, for all wavelengths between 1525 and 1565 nm, the optical signals transmitted through the transmission optical fiber and the dispersion compensating fiber exhibit a residual dispersion of less than 10 ps/nm per 100 km of the transmission optical fiber, preferably less than 2 ps/nm per 100

TABLE 2

| | | Example | | | | | | | |
|---|---|---|---|---|---|---|---|---|---|
| | | 1 | 2 | 3 | 4 | 5 | 6 | 7 | 8 |
| Dispersion | | | | | | | | | |
| @ 1500 nm | ps/nm-km | −138 | −139 | −138 | −181 | −181 | −180 | −166 | −165 |
| @ 1525 nm | ps/nm-km | −152 | −152 | −152 | −200 | −200 | −200 | −182 | −182 |
| @ 1550 nm | ps/nm-km | −167 | −167 | −167 | −220 | −220 | −220 | −200 | −200 |
| @ 1575 nm | ps/nm-km | −182 | −182 | −182 | −239 | −239 | −239 | −218 | −218 |
| @ 1600 nm | ps/nm-km | −195 | −196 | −195 | −252 | −251 | −254 | −233 | −234 |
| @ 1625 nm | ps/nm-km | −205 | −209 | −204 | −257 | −255 | −261 | −243 | −246 |
| D. Slope @ 1550 nm | ps/nm$^2$-km | −0.60 | −0.59 | −0.605 | −0.783 | −0.786 | −0.800 | −0.730 | −0.735 |
| Kappa 1550 nm | | 278 | 283 | 276 | 281 | 280 | 275 | 274 | 272 |
| Aeff 1550 nm | μm$^2$ | 14.7 | 12.4 | 14.1 | 14.3 | 14.3 | 12.5 | 14.1 | 12.0 |
| MFD 1550 nm | μm | 4.11 | 3.95 | 4.19 | 4.15 | 4.15 | 3.92 | 4.17 | 3.86 |
| Pin Array @ 1550 nm | dB | 8.2 | 1.0 | 3.1 | 10 | 7.9 | 1.1 | 9.3 | 0.6 |
| Theoretical Cutoff | nm | 1384 | 1446 | 1514 | 1482 | 1521 | 1557 | 1504 | 1547 |
| \|D\| × Aeff (@ 1550 nm) | attosec | 2455 | 2071 | 2355 | 3146 | 3146 | 2750 | 2820 | 2400 |

Embodiments of the DCF disclosed herein are suitable for incorporation into an optical fiber transmission line that also comprises a transmission optical fiber having a dispersion at 1550 nm between 14 and 22 ps/nm-km and a dispersion slope at 1550 nm less than 0.080 ps/nm$^2$-km, and in some km of the transmission optical fiber. In some embodiments, for all wavelengths between 1525 and 1625 nm, the optical signals transmitted through the transmission optical fiber and the dispersion compensating fiber exhibit a residual dispersion of less than 10 ps/nm per 100 km of the transmission optical fiber, preferably less than 5 ps/nm per 100 km of the transmission optical fiber. The transmission fiber and the DCF are optically coupled into an optical transmission line.

A selected length of DCF made in accordance with Example 1 or Example 2 can be optically coupled with a transmission optical fiber having a dispersion at 1550 nm between 16 and 17 ps/nm-km and a dispersion slope at 1550 nm of about 0.06 ps/nm$^2$-km in an optical fiber transmission line which has a residual dispersion with magnitude less than 0.02 ps/nm per km of the transmission optical fiber at every wavelength between 1525 and 1565 nm. A selected length of DCF made in accordance with Example 3 can be optically coupled with a transmission optical fiber having a dispersion at 1550 nm between 16 and 17 ps/nm-km and a dispersion slope at 1550 nm of about 0.06 ps/nm$^2$-km in an optical fiber transmission line which has a residual dispersion with magnitude less than 0.05 ps/nm per km of the transmission optical fiber at every wavelength between 1525 and 1625 nm.

The optical fibers disclosed herein can be made by a vapor deposition process, such as outside vapor deposition (OVD) process. Thus, for example, known OVD laydown, consolidation, and draw techniques may be advantageously used to produce the optical waveguide fiber disclosed herein. Other processes may be used, for example but in no way limited to, modified chemical vapor deposition (MCVD) or vapor axial deposition (VAD) or plasma chemical vapor deposition (PCVD).

Figure 4:
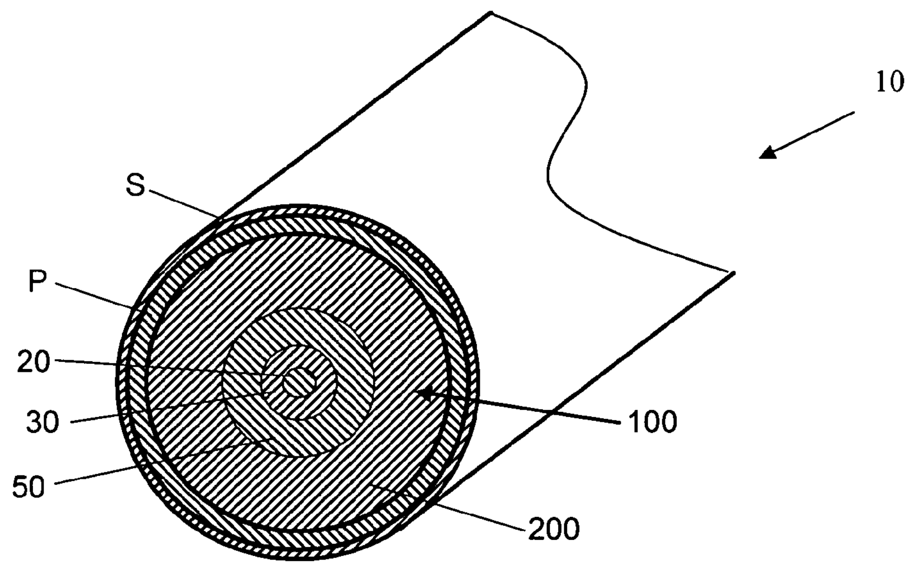
FIG. 4 shows an isometric cutaway representation of an embodiment of an optical waveguide fiber as disclosed herein.

FIG. 4 is a schematic representation (not to scale) of an optical waveguide fiber 10 as disclosed herein having core 100 and a cladding 200 directly adjacent and surrounding the core 100. The core comprises central segment 20, first annular segment 30 and second annular segment 50. The cladding 200 may be comprised of a cladding material which was deposited, for example during a laydown process, or which was provided in the form of a jacketing, such as a tube in a rod-in-tube optical preform arrangement, or a combination of deposited material and a jacket. The clad layer 200 is surrounded by a primary coating P and a secondary coating S. The refractive index of the cladding 200 is used to calculate the relative refractive index percentage as discussed elsewhere herein. Referring to the Figures, the cladding 200 has a refractive index of $n_c$ surrounding the core which is defined to have a $\Delta(r)=0\%$, which is used to calculate the refractive index percentage of the various portions or regions of an optical fiber or optical fiber preform.

In some embodiments, the optical fiber disclosed herein has a silica-based core 100 and cladding 200. In some embodiments, the cladding 200 has an outer diameter, 2*R,max, of about 125 μm. In some embodiments, the outer diameter of the cladding 200 has a constant diameter along the length of the optical fiber. In some embodiments, the refractive index of the optical fiber has radial symmetry. In some embodiments, the outer diameter of the core 100 has a constant diameter along the length of the optical fiber. In some embodiments, one or more coatings surround and are in contact with the cladding. The coating may be a polymer coating such as acrylate. In some embodiments, the coating has a constant diameter, radially and along the length of the fiber.

In some embodiments, the optical fibers disclosed herein have a low water content having an attenuation curve which exhibits a relatively low, or no, water peak in a particular wavelength region, especially around 1380 nm. Methods of producing low water peak optical fiber can be found in PCT Application Publication Numbers WO00/64825, WO01/47822, and WO02/051761, the contents of each being hereby incorporated by reference.

The dispersion compensating optical fiber disclosed herein is thus highly dispersive, allowing shorter lengths of the DCF to be optically coupled with transmission fiber, such as conventional single mode fiber, thereby reducing insertion losses and package sizes. The product of the effective area and dispersion is sufficiently high to reduce nonlinear impairments.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:

a core disposed about a centerline; and a cladding surrounding the core;

wherein the core and cladding define a relative refractive index profile;

wherein the core comprises:

a central segment extending radially outward from the centerline;

a first annular segment surrounding the central segment; and a second annular segment surrounding the first annular segment;

wherein the refractive index profile provides an effective area at 1550 nm less than or equal to 15.0 μm$^2$, a dispersion at 1550 nm more negative than −150 ps/nm/km, and a kappa at 1550 nm greater than 100 nm, wherein kappa is dispersion at 1550 nm divided by dispersion slope at 1550 nm, and wherein the relative refractive index profile of the central segment has an alpha shape with an alpha greater than 10.

2. The optical fiber of claim 1 wherein the optical fiber exhibits a pin array bend loss at 1550 nm of less than 10 dB.

3. The optical fiber of claim 1 wherein the kappa at 1550 nm is greater than 200 nm.

4. The optical fiber of claim 1 wherein the central segment comprises a maximum relative refractive index $\Delta_{1MAX}$ greater than 1.8%.

5. The optical fiber of claim 1 wherein the first annular segment comprises a minimum relative refractive index $\Delta 2_{MIN}$ more negative than −0.35%.

6. The optical fiber of claim 1 wherein the central segment extends to a radius, R1, between 0.7 and 1.5 μm.

7. The optical fiber of claim 1 wherein the first annular segment extends to a radius, R2, between 3.0 and 4.5 μm.

8. The optical fiber of claim 1 wherein the first annular segment extends for a radial width, $W_2$, between 2.0 and 3.0 μm.

9. The optical fiber of claim 1 wherein the first annular segment has a midpoint, $R2_{MID}$, between 2.1 and 2.7 μm.

10. The optical fiber of claim 1 wherein the second annular segment comprises a maximum relative refractive index $\Delta3_{MAX}$ greater than 0.25%.

11. The optical fiber of claim 1 wherein the second annular segment has half-height peak width, HHPW3, between 0.5 and 1.2 μm.

12. The optical fiber of claim 1 wherein the second annular segment has half-height peak midpoint, $R3_{HHMID}$, between 4.0 and 6.0 μm.

13. The optical fiber of claim 1 wherein the second annular segment has a midpoint, $R3_{MID}$, between 4.0 and 6.0 μm.

14. The optical fiber of claim 1 wherein the second annular segment has a width, W3, between 0.5 and 4.0 μm.

15. The optical fiber of claim 1 wherein the refractive index profile provides a mode field diameter at 1550 nm of between 3.90 and 4.20 μm.

16. The optical fiber of claim 1 wherein the refractive index profile provides a theoretical cutoff of less than 1570 nm.

17. The optical fiber of claim 1 wherein the product of the effective area at 1550 nm and the absolute magnitude of the dispersion at 1550 nm is greater than 2000 attoseconds.

18. The optical fiber of claim 1 wherein the refractive index profile provides a dispersion slope at 1550 nm of between −0.5 and −1.0 ps/nm$^2$/nm.

19. An optical fiber transmission line comprising:
- a transmission optical fiber having a dispersion at 1550 nm between 14 and 22 ps/nm-km and a dispersion slope at 1550 nm less than 0.08 ps/nm$^2$-km; and
- the dispersion compensating fiber of claim 1 optically coupled to the transmission optical fiber.

20. An optical fiber comprising:
- a core disposed about a centerline; and
- a cladding surrounding the core;
- wherein the core and cladding define a relative refractive index profile;
- wherein the core comprises:
  - a central segment extending radially outward from the centerline;
  - a first annular segment surrounding the central segment; and
  - a second annular segment surrounding the first annular segment;
- wherein the refractive index profile provides an effective area at 1550 nm less than or equal to 15.0 μm$^2$, a dispersion at 1550 nm more negative than −150 ps/nm/km, and a kappa at 1550 nm greater than 100 nm, wherein kappa is dispersion at 1550 nm divided by dispersion slope at 1550 nm, and wherein the central segment extends to a radius, R1, between 0.7 and 1.5 μm, and wherein the optical fiber exhibits a pin array bend loss at 1550 nm of less than 10 dB.

21. An optical fiber comprising:
- a core disposed about a centerline; and
- a cladding surrounding the core;
- wherein the core and cladding define a relative refractive index profile;
- wherein the core comprises:
  - a central segment extending radially outward from the centerline;
  - a first annular segment surrounding the central segment; and
  - a second annular segment surrounding the first annular segment;
- wherein the refractive index profile provides an effective area at 1550 nm less than or equal to 15.0 μm$^2$, a dispersion at 1550 nm more negative than −150 ps/nm/km, and a kappa at 1550 nm greater than 100 nm, wherein kappa is dispersion at 1550 nm divided by dispersion slope at 1550 nm, and wherein the refractive index profile provides a theoretical cutoff of less than 1570 nm.

* * * * *